(12) United States Patent (10) Patent No.: US 7,388,143 B1
Maiani (45) Date of Patent: Jun. 17, 2008

(54) SIMPLIFIED SHEET MUSIC DEVICE AND METHOD

(76) Inventor: Patrick Maiani, 154 Hot Springs Rd., Montecito, CA (US) 93108

( * ) Notice: Subject to any disclaimer, the term of this patent is extended or adjusted under 35 U.S.C. 154(b) by 39 days.

(21) Appl. No.: 11/538,435

(22) Filed: Oct. 3, 2006

(51) Int. Cl.
*G09B 15/00* (2006.01)
(52) U.S. Cl. .................................... 84/470 R
(58) Field of Classification Search ............. 84/470 R, 84/478, 479 A, 483.2, 483.1, 484
See application file for complete search history.

(56) References Cited

U.S. PATENT DOCUMENTS 6,166,313 A * 12/2000 Miyamoto ................ 84/477 R

* cited by examiner

*Primary Examiner*—Kimberly R Lockett
(74) *Attorney, Agent, or Firm*—Laura Tunnell (57) ABSTRACT

The device and method disclosed aids in the learning of traditional sheet by providing an intermediary, more simplified system of musical notation. Unlike much of the prior art, the device and method of the present invention does not require a computer, the use of color, extraneous hardware or any type of attachment to the musical instrument.

1 Claim, 7 Drawing Sheets

Twinkle Twinkle Little Star

|   | 1 | 1 | 5 | 5 | 6 | 6 | 5 |
|---|---|---|---|---|---|---|---|
| R | C | C | G | G | A | A | G_ |
| L | Twin | kle | Twin | kle | Lit | tle | Star |

C eg

|   | 4 | 4 | 3 | 3 | 2 | 2 | 1 |
|---|---|---|---|---|---|---|---|
| R | F | F | E | E | D | D | C |
| L | How | I | Won | der | What | You | Are |

F ac

|   | 5 | 5 | 4 | 4 | 3 | 3 | 2 |
|---|---|---|---|---|---|---|---|
| R | G | G | F | F | E | E | D_ |
| L | Up | A | bove | The | Sky | So | High |

G bd

|   | 5 | 5 | 4 | 4 | 3 | 3 | 2 |
|---|---|---|---|---|---|---|---|
| R | G | G | F | F | E | E | D_ |
| L | Like | A | Dia | mond | In | The | Sky |

SIMPLIFIED SHEET MUSIC DEVICE AND METHOD

FIELD OF THE INVENTION

The invention disclosed herein relates generally to devices and methods that aid in the teaching of music to a beginning or young student.

BACKGROUND AND PRIOR ART

The best musical artists develop at an early age. Having a very innate need to communicate at the most basic level, a young mind has yet to be distracted by a significant dependence on other means of communication. As the young artist grows, the acquisition of technical skills must be kept in congruence with an increasing musical development. Among the many tasks at hand, the young musician must learn to correlate their chosen instrument with traditional musical notation. Considering the complexity of traditional musical notation, this can be problematic and often results in the loss of a potential future musician.

This issue is the subject of many patents including U.S. Pat. Nos. 4,416,182, 5,183,398, 6,204,441, 6,388,181, 6,066,791, 5,540,132, 6,337,433, and 6,284,961. However, these cases as well as others like them, require specialized equipment and/or extraneous devices such as color coded tags affixed to the instrument. Many require a computer display or color-coded sheet music. Indeed, some propose that the traditional method of printing sheet music be abandoned altogether in favor of other methods of musical notation that, although meritous in some ways, often trade the inherent and necessary complexity of traditional sheet music with trinkets and hardware that eventually prove to be even more burdensome.

SUMMARY

The objective of this invention is to provide a device and method to aid in the learning of traditional sheet music that does not attempt to replace, but rather facilitate proficiency with traditional sheet music by providing an intermediary approximated method.

The objective of this invention is to provide a device and method to aid in the learning of traditional sheet music that requires neither hardware nor extraneous attachments or modifications to the musical instrument.

The objective of this invention is to provide a device and method to aid in the learning of traditional sheet music that can be conveyed without the use of color.

The above objectives are met by a system of musical notation comprising a phrase line disposed on a viewable medium. The phrase line includes a long horizontal line having a left end and a right end; the character designation "R" is positioned above the left end, the character designation "L" is in vertical alignment with the character designation "R" and is positioned below the left end of the horizontal line. A short vertical line dissects the long horizontal line immediately to the right of the character designations "R" and "L". A character sequence is superimposed on the phrase line. The character sequence is comprised of individual characters selected from the set of individual characters consisting of: "A", "B", "C", "D", "E", "F", and "G", the individual characters being representative of like notes on the piano.

The system optionally includes a chord box. The chord box comprises two or more individual characters of the set enclosed within a box.

The system optionally includes an asterisk character. The asterisk character is positioned immediately to the left of an individual character of the set to indicate a half tonal decrease and is positioned immediately to the right of an individual character of the set to indicate a half tonal increase.

The system optionally includes an arrow character. The arrow character has a head and a tail and is positioned between a first individual character of the set and a second individual character of the set. The head is positioned upward to indicate a tonal increase from the first individual character to the second individual character and downward to indicate a tonal decrease.

The system optionally includes one or more dash characters. The dash characters are positioned after an individual character of the set. The individual character is characterized by a tone and duration. The particular number of dash characters is indicative of the duration applied to the tone corresponding to the individual character.

The system optionally includes one or more empty box characters. The particular number of box characters indicatives a duration wherein silence is maintained.

The system can be recorded on a computer readable medium.

The system can be recorded on a human readable medium.

DESCRIPTION OF THE PREFERRED EMBODIMENTS

The term "traditional" or "traditional notation", as used herein, is indicative of the standard musical notation system used in piano sheet music.

The term "simplified" or "simplified notation", as used herein, is indicative of the notation and techniques of the present invention.

DESCRIPTION OF THE PREFERRED EMBODIMENTS

Figure 1:
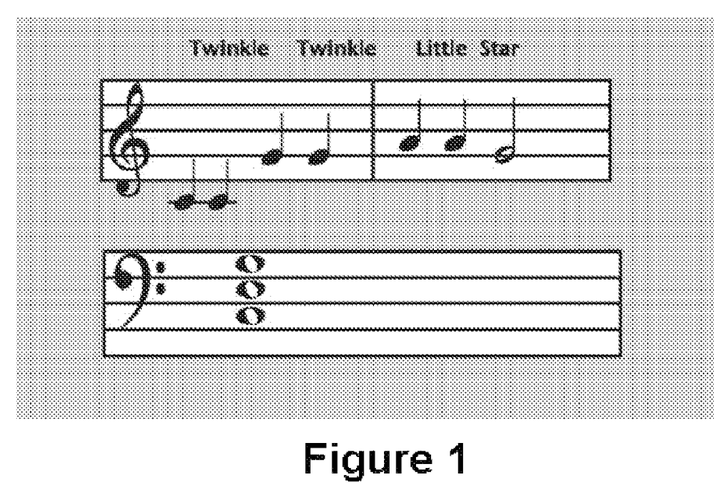
FIG. 1: Illustration of the first two bars of the popular song "Twinkle Twinkle Little Star" in traditional musical notation.
Figure 2:
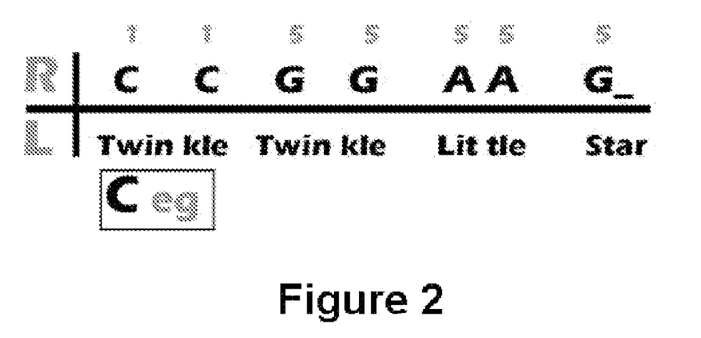
FIG. 2: Illustration of the same first two bars as in FIG. 1 using the simplified musical notation of the present invention.
Figure 3:
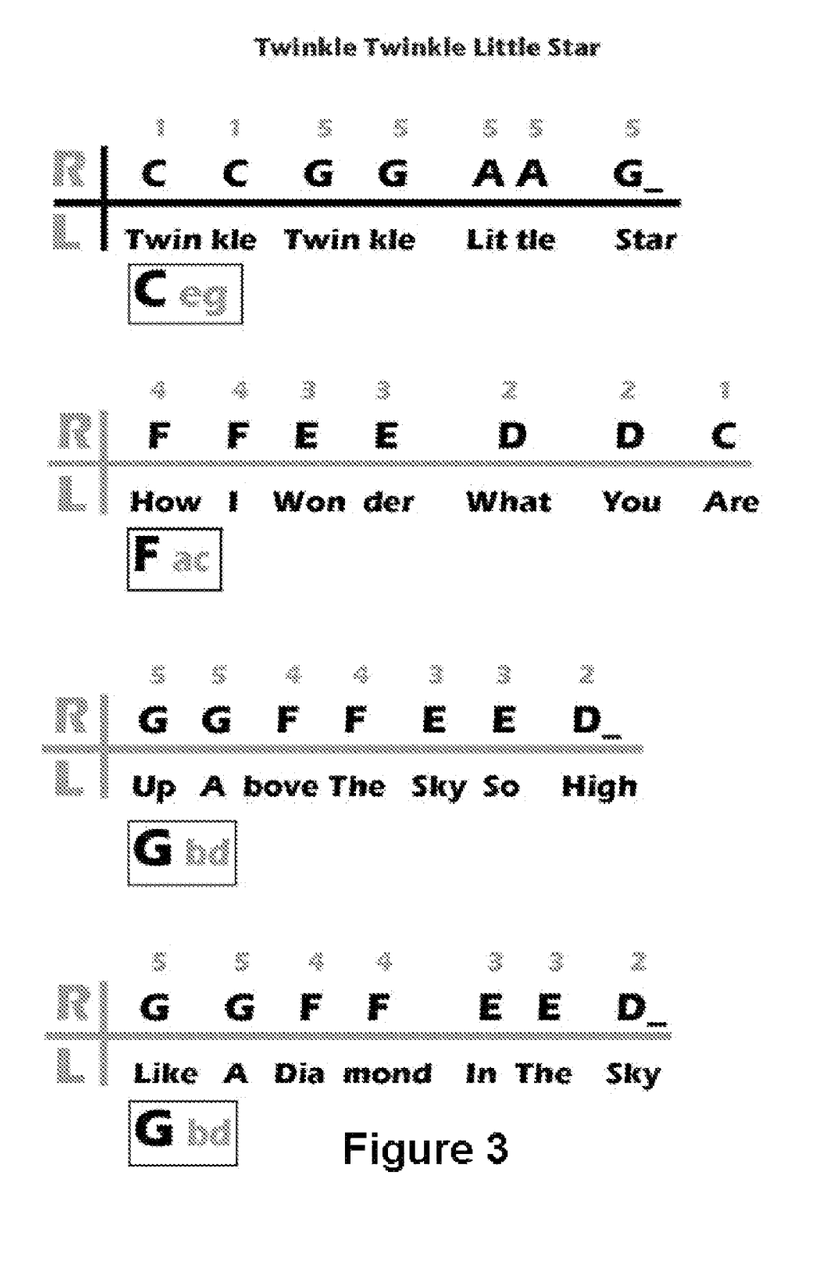
FIG. 3: Illustration of the song "Twinkle Twinkle Little Star" in its entirety using the simplified musical notation of the present invention.
Figure 4:
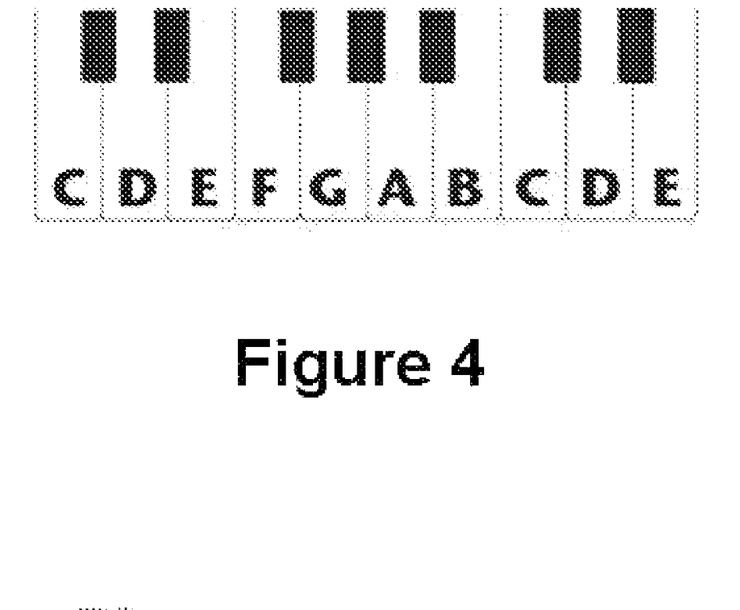
FIG. 4: Illustration of the black and white key layout of a piano and the corresponding lettered notation.

As stated in the figure description, the popular song "Twinkle Twinkle Little Star" is exemplified in the first three figures to both illustrate the general features of the simplified musical notation as described in the present invention and to compare it with features of traditional musical notation. A detailed comparison of the first bar is shown in FIGS. 1 and 2. The song in its entirety is included in FIG. 3 to give an overall sense of a relatively full use of the simplified method. Details of the differences between the renditions of FIGS. 1 and 2 will be described in the paragraphs below.

Figure 5:
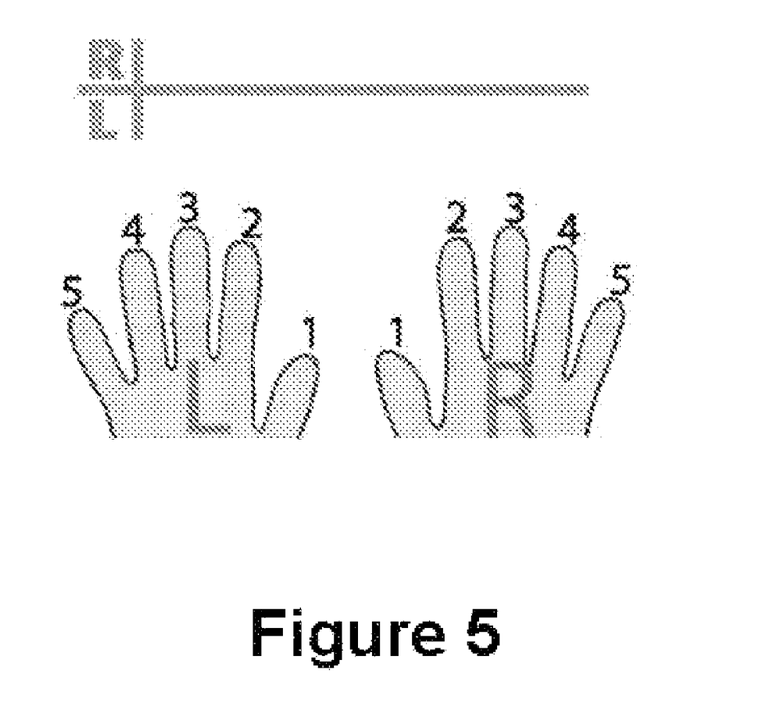
FIG. 5: Illustration of a pair of hands with numbered fingers and a phrase line of the present invention. The left hand is indicated by "L printed on the hand as well as on the lower half phrase line. The right hand is indicated similarly but is correlated with the upper half of the phrase line indicating that the upper notes are played with the right hand and the lower notes, with the left hand.

As in traditional notation, reading is executed from left to right and from top to bottom on a page. Although, the entire layout of the song is strikingly different between FIGS. 1 and 2, the latter is clearly a simpler approximation of the former. The traditional paired staff arrangement of FIG. 1 is approximated by the simple crossed line arrangement of FIG. 2. This simplification is illustrated in more detail in FIG. 5 where the left and right hand placement is indicated by "L" and "R", respectively. In effect, the uppermost five line staff of FIG. 1 has been approximated by the upper half of the crossed line arrangement of FIGS. 2 and 5. Similarly, the lowermost five line staff of FIG. 1 has been approximated by the lower half of the crossed line arrangement of FIGS. 2 and 5. In this aspect as well as others, the more essential elements of FIG. 1 have been simplified to the minimal elements of FIG. 2.

The rendering of notes in FIGS. 1 and 2 is also strikingly different, although not incompatible. Whereas the simplified rendition of FIG. 2 simply states the required note to be played, the traditional notation of FIG. 1 demands a relatively complicated series of steps before the note can be executed. The musician must first determine where the note is positioned within the myriad of staff lines and the spaces therebetween. Then, he or she must correlate the immediate position with a note on the piano or other instrument. The simplified method eliminates the first step. When the young musician develops sufficient confidence and proficiency using the simplified method of reading notes, the traditional five line staff and note method can be introduced as a natural progression to the next level.

Figure 6:
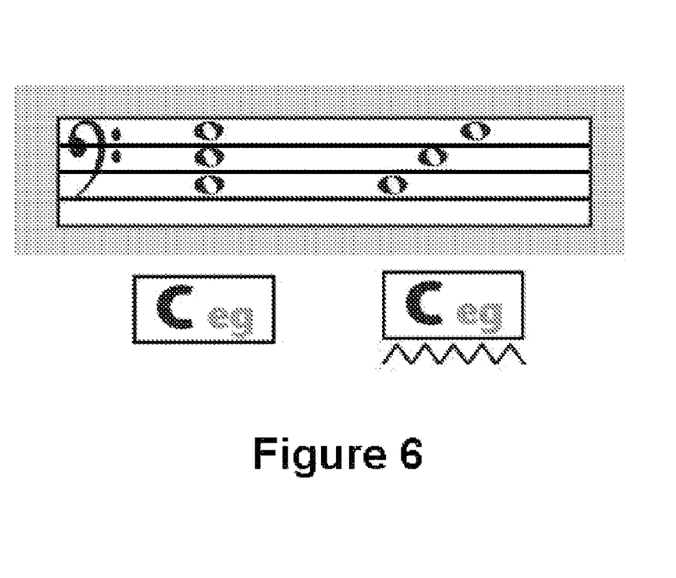
FIG. 6: This figure indicates the musical nomenclature for a chord using traditional musical notation as well as the notation used in the simplified method of the present invention. The nomenclature for a broken chord is indicated on the right.

Chords are simplified as well. As in the case of individual notes, they are explicitly stated but differentiated by their enclosure in a "chord box". FIG. 6 illustrates this concept in more detail. Again, traditional notation is indicated in the upper part of the figure, and the corresponding simplified notation is shown below, in the lower part of the figure. If the chord is to be broken, a jagged line is placed under the chord box as indicated.

Figure 7:
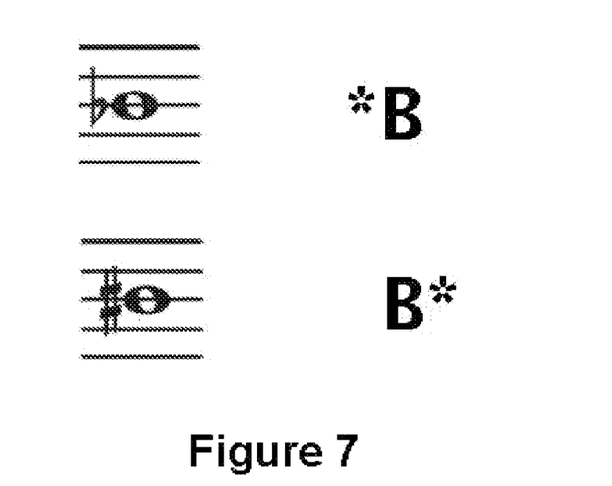
FIG. 7: An indication of the simplified nomenclature used for flats and sharps is shown. Flats are indicated by a left flanking asterisk, sharps are indicated by a right flanking asterisk.

Other attributes of the simplified musical notation of the present method are shown in FIGS. 7-10. FIG. 7 indicates how the placement of an asterisk before or after a note approximates the designation of a sharp or flat. The tone of a flat note is decreased by one half-step. Using piano keys as an example, the key immediately to the left of the unaltered note is to be played. A similar procedure is followed for sharp notes with the words "decreased" and "left" being replaced by the words "increased" and "right". In the traditional method of musical notation, the young musician must first notice the note has an extra appendage and then correlate the extraneous appendage with the direction of tonal change. The present simplified method indicates the direction of tonal change simply by its position with respect to the unaltered note. Again, the simplified method is more direct and eliminates steps, thereby facilitating the confidence and proficiency of the young musician.

Figure 8:
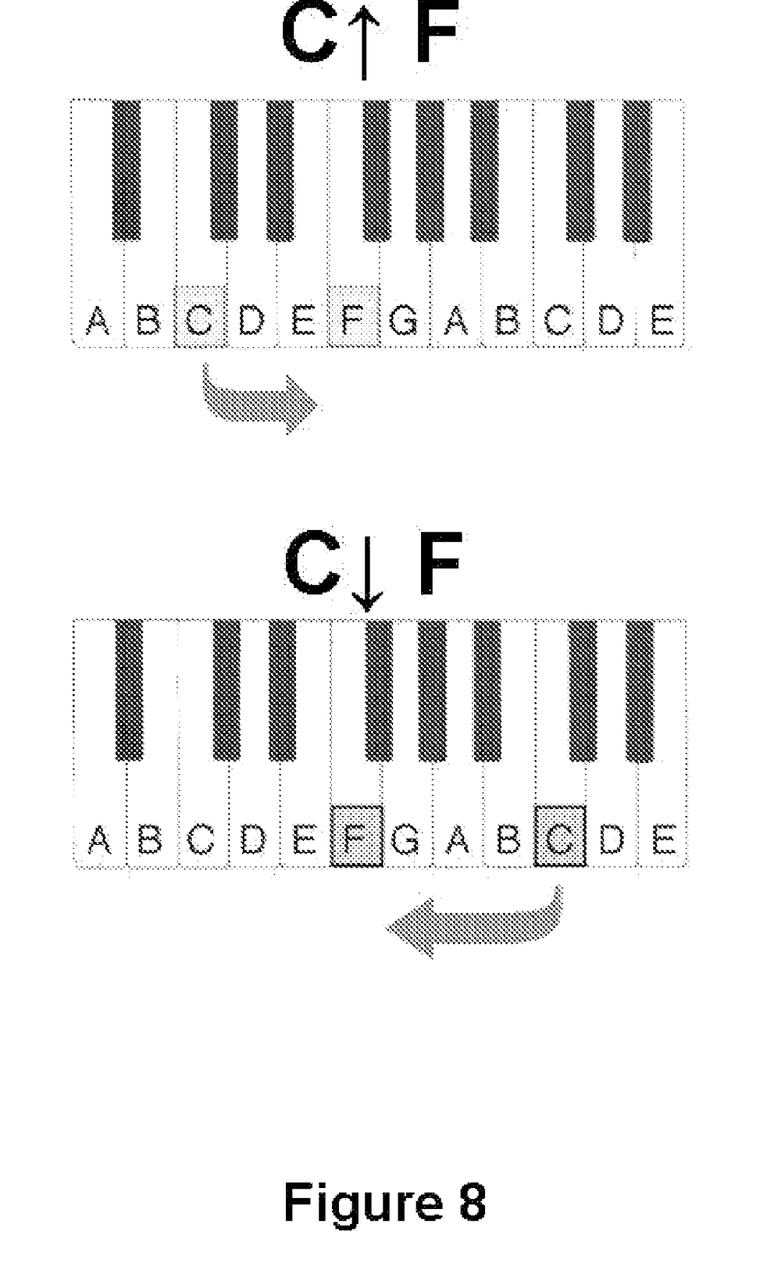
FIG. 8: The simplified method of indicating how the relative aural direction of two successive notes is correlated with their respective positions on the piano. For instance, "C" followed by the "F" above "C" as opposed to "F" below "C", is indicated by an upward pointing arrow interspersed between the two. Similarly, a downward pointing arrow is interspersed for the case of "F" below "C".

FIG. 8 illustrates denoting the relative tonal direction of a given note with respect its immediate predecessor. In the simplified notation, "C" followed by "F" could indicate instructions to play "C" first, then play "F" below the "C". Alternatively, it could also indicate instructions that "C" is to be followed by the "F" above the preceding "C". An interspersed upward pointing arrow is used to indicate the latter and a lower pointing arrow, the former as is shown in the figure.

Figure 9:
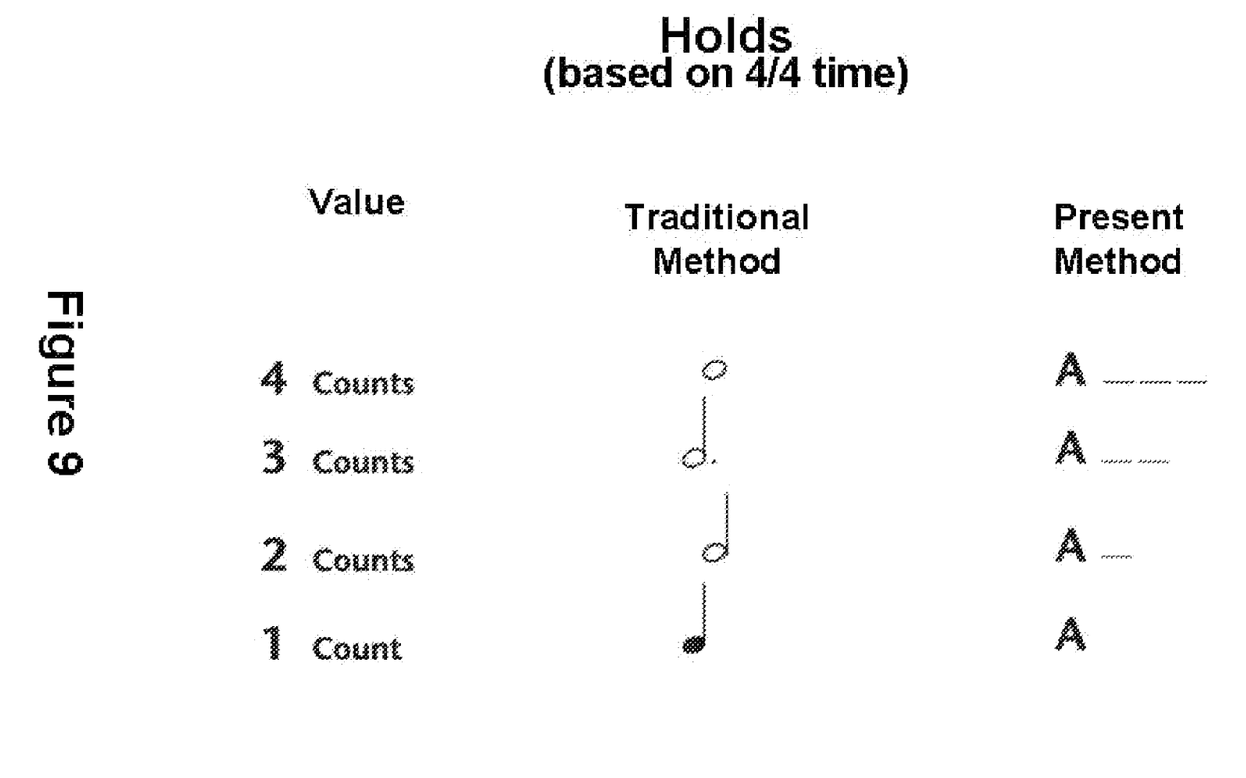
FIG. 9: Based on a 4/4 count, the traditional versus simplified method of indicating "holds" is compared in this figure.
Figure 10:
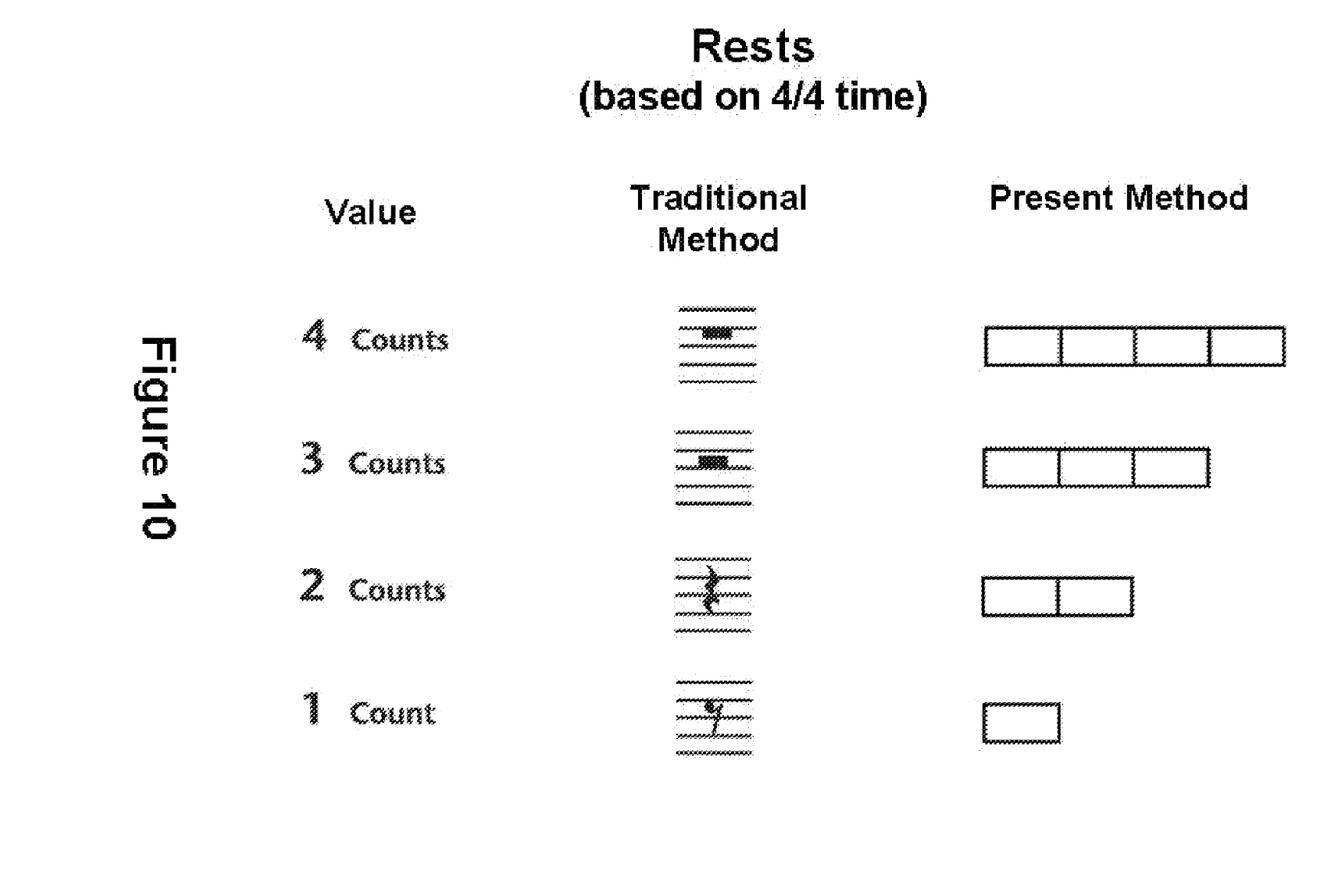
FIG. 10: Similarly to the previous figure, the traditional versus simplified method of indicating "rests" is compared.

FIGS. 9-10 indicate the relationship between the traditional and simplified methods of indicating "holds" and "rests", respectively. Essentially, the number of symbols is equal to the duration, in units of one count, of the "rest" or "hold". The relationship between the instructions and the action taken is again very direct, retaining only essential steps to navigate therebetween.

Only the most basic of essential musical notation has been addressed in this disclosure. Many other, similarly intuitive, approximations to traditional musical notation have been developed as part of this method. Those explicitly addressed herein, as well as others, can be recorded to both paper and computer readable mediums. Moreover, although the piano has been used as an example in the description of this method, the method as described can be adapted to virtually any musical instrument.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of communicating musical instructions comprising the steps of:
   a) presenting a phrase line disposed on a viewable medium, said phrase line comprising a long horizontal line having a left end and a right end, the character designation "R" being positioned above said left end of said horizontal line, the character designation "L" being in vertical alignment with said character designation "R" and positioned below said left end of said horizontal line, and a short vertical line dissecting said long horizontal line immediately to the right of said character designations "R" and "L",
   b) presenting a character sequence superimposed on said phrase line, said character sequence being comprised of individual characters selected from the set of individual characters consisting of: "A", "B", "C", "D", "E", "F", and "G", said individual characters being representative of like notes on the piano, c) presenting a chord box, said chord box comprising two or more individual characters of said set enclosed within a box,
d) presenting an asterisk character, wherein said asterisk character is positioned immediately to the left of an individual character of said set to indicate a half tonal decrease and wherein said asterisk character is positioned immediately to the right of an individual character of said set to indicate a half tonal increase
e) presenting an arrow character, said arrow character having a head and a tail, said arrow character being positioned between a first individual character of said set and a second individual character of said set, wherein said head is positioned upward to indicate a tonal increase from said first individual character to said second individual character and wherein said head is positioned downward to indicate a tonal decrease from said first individual character to said second individual character,
f) presenting one or more dash characters, said one or more dash characters being positioned after an individual character of said set, said individual character being characterized by a tone and duration, wherein the number of said one or more dash characters is indicative of the duration applied to said tone of said individual character, and
g) presenting one or more empty box characters, wherein the number of said one or more empty box characters is indicative of the duration wherein silence is maintained.

* * * * *